(12) United States Patent
Saldamli

(10) Patent No.: US 9,313,763 B2
(45) Date of Patent: Apr. 12, 2016

(54) COMPUTING SYSTEM WITH LOCATION DETECTION MECHANISM AND METHOD OF OPERATION THEREOF

(71) Applicant: Samsung Electronics Co., Ltd., Gyeonggi-Do (KR)

(72) Inventor: Gokay Saldamli, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 70 days.

(21) Appl. No.: 14/100,542

(22) Filed: Dec. 9, 2013

(65) Prior Publication Data

US 2014/0162689 A1 Jun. 12, 2014

Related U.S. Application Data

(60) Provisional application No. 61/735,896, filed on Dec. 11, 2012.

(51) Int. Cl.
| | |
|---|---|
| *H04B 7/00* | (2006.01) |
| *H04M 11/00* | (2006.01) |
| *H04W 24/00* | (2009.01) |
| *H04W 64/00* | (2009.01) |

(52) U.S. Cl.
CPC .................................... *H04W 64/00* (2013.01)

(58) Field of Classification Search
None
See application file for complete search history.

(56) References Cited

U.S. PATENT DOCUMENTS

| | | | | |
|---|---|---|---|---|
| 5,539,395 | A * | 7/1996 | Buss et al. | 340/7.43 |
| 7,035,647 | B2 | 4/2006 | de Verteuil | |
| 7,983,949 | B1 * | 7/2011 | Joseph et al. | 705/14.57 |
| 2003/0148771 | A1 * | 8/2003 | de Verteuil | 455/456 |
| 2009/0044246 | A1 * | 2/2009 | Sheehan et al. | 725/146 |
| 2010/0008311 | A1 * | 1/2010 | Oh et al. | 370/329 |
| 2012/0324228 | A1 * | 12/2012 | Padhye et al. | 713/176 |
| 2013/0217418 | A1 | 8/2013 | Maurin et al. | |

OTHER PUBLICATIONS

Proximity Awareness and Analytics, 2012, pp. 1-19, Motorola Solutions, Inc.
Trevisani et al., Cell-ID location technique, limits and benefits: an experimental study, 2004, pp. 1-10, IEEE.
Krumm, et al., The NearMe Wireless Proximity Server, 2004, pp. 1-18, Microsoft Research Microsoft Corporation.

* cited by examiner

*Primary Examiner* — Marivelisse Santiago Cordero
*Assistant Examiner* — Moustapha Diaby
(74) *Attorney, Agent, or Firm* — IP Investment Law Group

(57) ABSTRACT

A computing system includes: a communication unit configured to: communicate a cell location A without a grid location A for identifying one of grid cells where a current location A is located, communicate a cell location B with a grid location B for identifying one of grid areas with one of the grid cells where a current location B is located, and a control unit, coupled to the communication unit, configured to: generate a grid identification prediction based on predicting a grid identification of one of the grid areas where the cell location A is located nearest to the cell location B, and generate a proximity result based on the grid identification prediction matching the grid location A for determining whether the current location A is near the current location B.

25 Claims, 8 Drawing Sheets

COMPUTING SYSTEM WITH LOCATION DETECTION MECHANISM AND METHOD OF OPERATION THEREOF

CROSS-REFERENCE

This application claims the benefit of U.S. Provisional Patent Application Ser. No. 61/735,896 filed Dec. 11, 2012, and the subject matter thereof is incorporated herein by reference thereto.

TECHNICAL FIELD

An embodiment of the present invention relates generally to a computing system, and more particularly to a system for location detection mechanism.

BACKGROUND

Modern portable consumer and industrial electronics, especially client devices such as navigation systems, cellular phones, portable digital assistants, and combination devices are providing increasing levels of functionality to support modern life including information sharing services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Thus, a need still remains for a computing system with location detection mechanism for aiding the management of task and information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides a computing system including: a communication unit configured to: communicate a cell location A without a grid location A for identifying one of grid cells where a current location A is located, communicate a cell location B with a grid location B for identifying one of grid areas with one of the grid cells where a current location B is located, and a control unit, coupled to the communication unit, configured to: generate a grid identification prediction based on predicting a grid identification of one of the grid areas where the cell location A is located nearest to the cell location B, and generate a proximity result based on the grid identification prediction matching the grid location A for determining whether the current location A is near the current location B.

An embodiment of the present invention provides a computing system including: a communication unit configured to: communicate a cell location A without a grid location A for identifying one of grid cells where a current location A is located, communicate a grid identification prediction of a grid identification of one of grid areas where the cell location A is located nearest to a cell location B, and a control unit, coupled to the communication unit, configured to: generate a proximity result based on the grid identification prediction matching the grid location A for determining whether the current location A is near a current location B.

An embodiment of the present invention provides a computing system including: a communication unit configured to: communicate a cell location A without a grid location A for identifying one of grid cells where a current location A is located, a control unit, coupled to the communication unit, configured to: determine a cell location B with a grid location B for identifying one of grid areas with one of the grid cells where a current location B is located, and generate a grid identification prediction based on predicting a grid identification of one of the grid areas where the cell location A is located nearest to the cell location B.

An embodiment of the present invention provides a method of operation of a computing system including: communicating a cell location A without a grid location A for identifying one of grid cells where a current location A is located; communicating a cell location B with a grid location B for identifying one of grid areas with one of the grid cells where a current location B is located; generating a grid identification prediction based on predicting a grid identification of one of the grid areas where the cell location A is located nearest to the cell location B; and generating a proximity result with a control unit based on the grid identification prediction matching the grid location A for determining whether the current location A is near the current location B.

An embodiment of the present invention provides a non-transitory computer readable medium including: communicating a cell location A without a grid location A for identifying one of grid cells where a current location A is located; communicating a cell location B with a grid location B for identifying one of grid areas with one of the grid cells where a current location B is located; generating a grid identification prediction based on predicting a grid identification of one of the grid areas where the cell location A is located nearest to the cell location B; and generating a proximity result based on the grid identification prediction matching the grid location A for determining whether the current location A is near the current location B.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
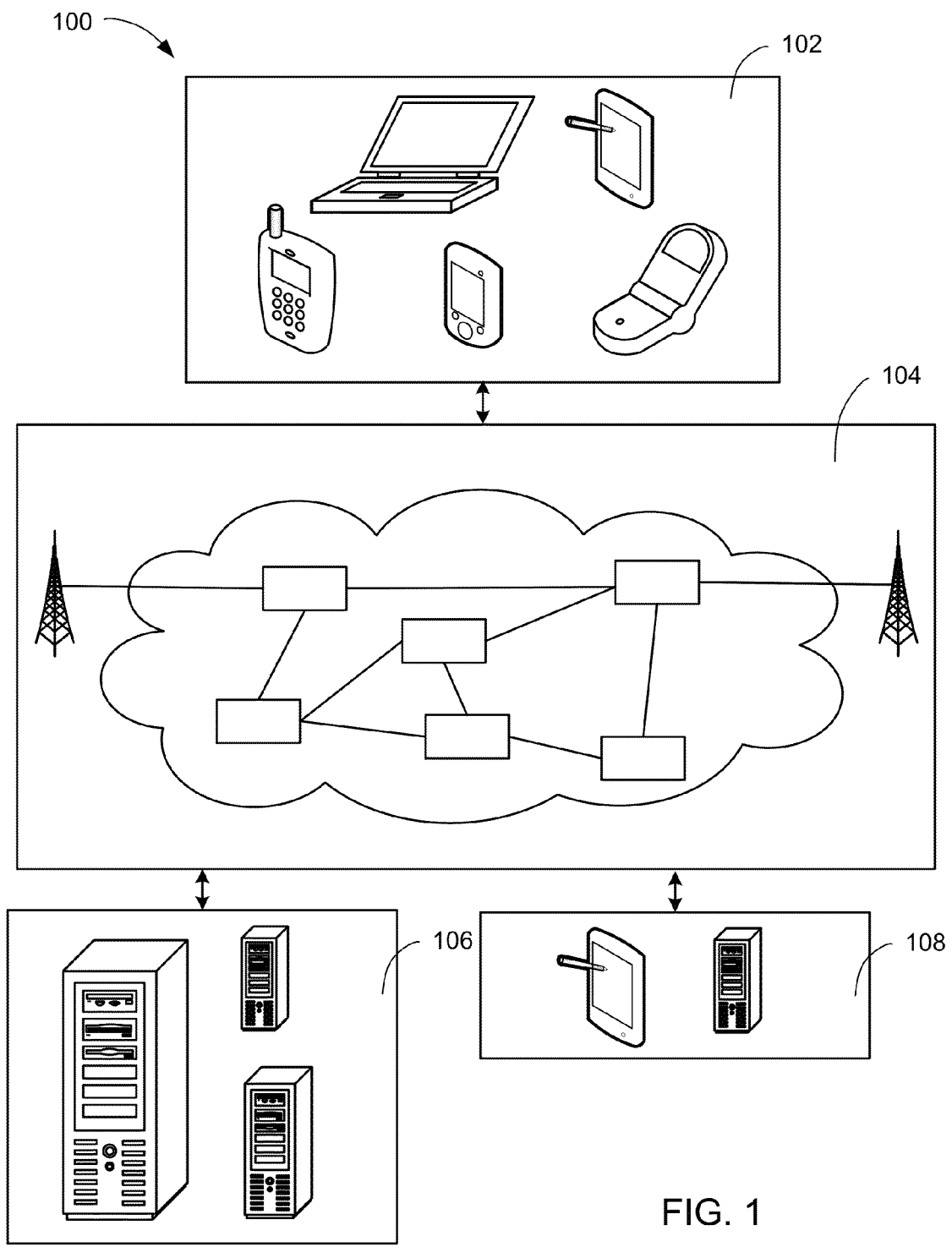
FIG. 1 is a computing system with location detection mechanism in an embodiment of the present invention.

An embodiment of the present invention generates a proximity result for optimizing a private equality testing to determine whether a user A is near a user B. More specifically, a grid identification prediction is generated to determine a grid area where the user A is located without disclosing a grid identification of the grid area to the user B. As a result, the user A can maintain the privacy yet improve the accuracy of whether the user B is near the user A.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with location detection mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network. The computing system 100 can also include a third device 108 connected to the first device 102, the second device 106, or a combination thereof with the communication path 104. The third device 108 can be a client or server.

For example, the first device 102 or the third device 108 can be of any of a variety of display devices, such as a cellular phone, personal digital assistant, wearable digital device, tablet, notebook computer, television (TV), automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the computing system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the computing system 100 is shown with the second device 106 and the first device 102 or the third device 108 as end points of the communication path 104, although it is understood that the computing system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
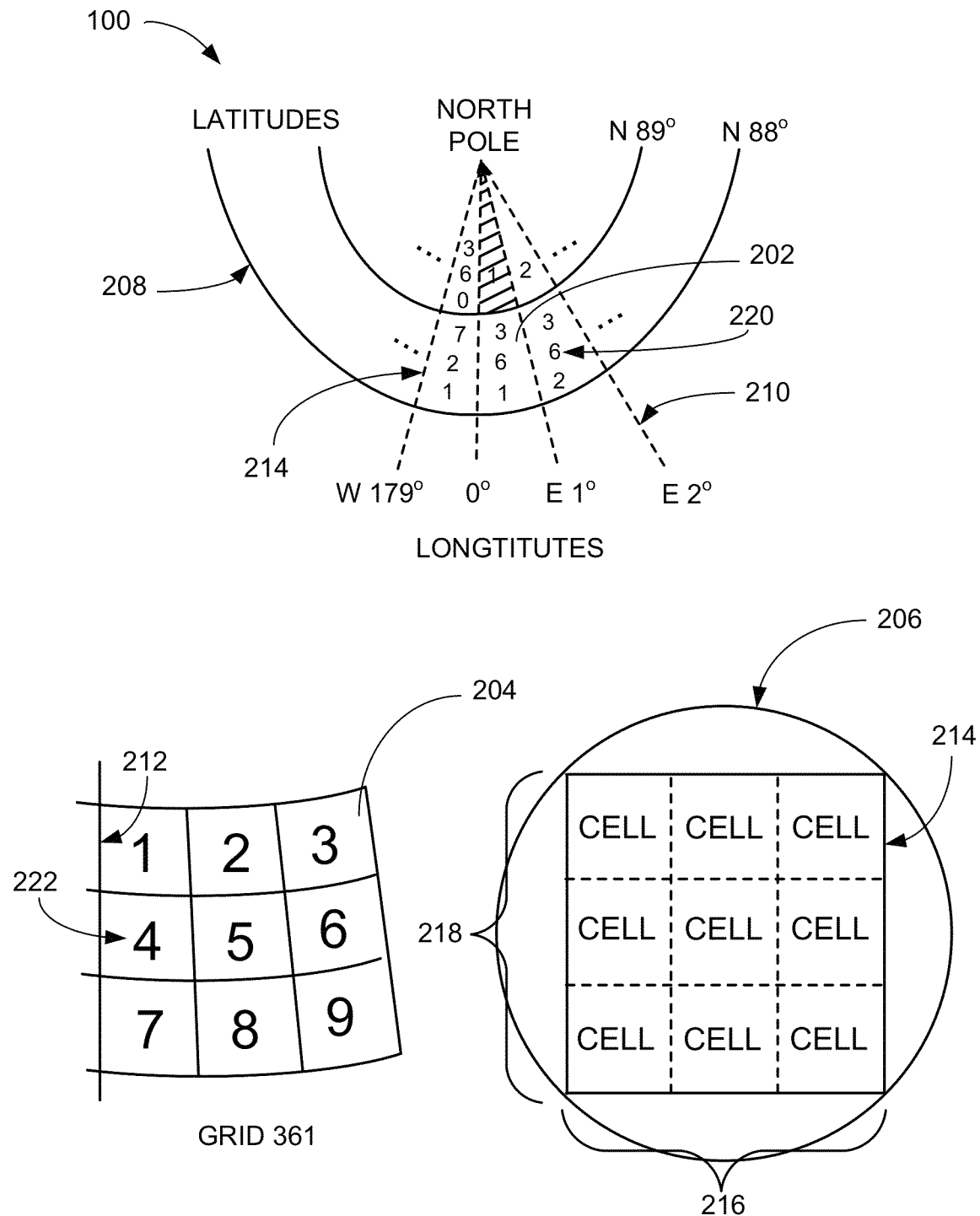
FIG. 2 is an example of the computing system generating a grid area.

Referring now to FIG. 2, therein is shown an example of the computing system 100 generating a grid area 202. For clarity and brevity, the discussion of an embodiment of the present invention will focus on the first device 102 of FIG. 1 will be used by a user A and the third device 108 of FIG. 1 will be used by a user B. The user A and the user B can both represent users of the computing system 100.

For further clarity and brevity, the discussion of the embodiment of the present invention will focus on the user A requesting the computing system 100 to determine whether the user B is near the user A. Thus, the computing system 100 will deliver the result of a private equality testing as an example to the first device 102. However, the second device 106 of FIG. 1, the first device 102, and the third device 108 can be discussed interchangeably. And the user A and the user B can be discussed interchangeably, as the user B can request whether the user A is near the user B.

The grid area 202 is a union of instances of a grid cell 204 approximating an approximation shape 206. The grid cell 204 is a segmented section of the grid area 202. The approximation shape 206 can represent a polygon, a circle, or a combination thereof.

The computing system 100 can generate the grid area 202 by segmenting the surface of the Earth with latitude information 208, longitude information 210, or a combination thereof. The latitude information 208 is the angular distance north or south from the equator of a point on the earth's surface, measured on the meridian of the point. The longitude information 210 is the angular distance east or west on the Earth's surface, measured by the angle contained between the meridian of a particular place and some prime meridian, as that of Greenwich, England, and expressed either in degrees or by some corresponding difference in time.

The segmentation of the Earth's surface to create the grid area 202 can also establish a grid boundary 212. The grid boundary 212 is an extent of the grid area 202 that establishes the borderline of the grid area 202. For example, the grid boundary 212 can establish a boundary side 214 of the grid area 202. For further example, the boundary side 214 can provide a dimension, such as a grid width 216, a grid height 218, or a combination thereof, of the grid area 202.

The grid area 202 can have a grid identification 220, which is information to identify a particular instance of the grid area 202. The grid cell 204 can have a cell identification 222, which is information to identify a particular instance of the grid cell 204.

Figure 3:
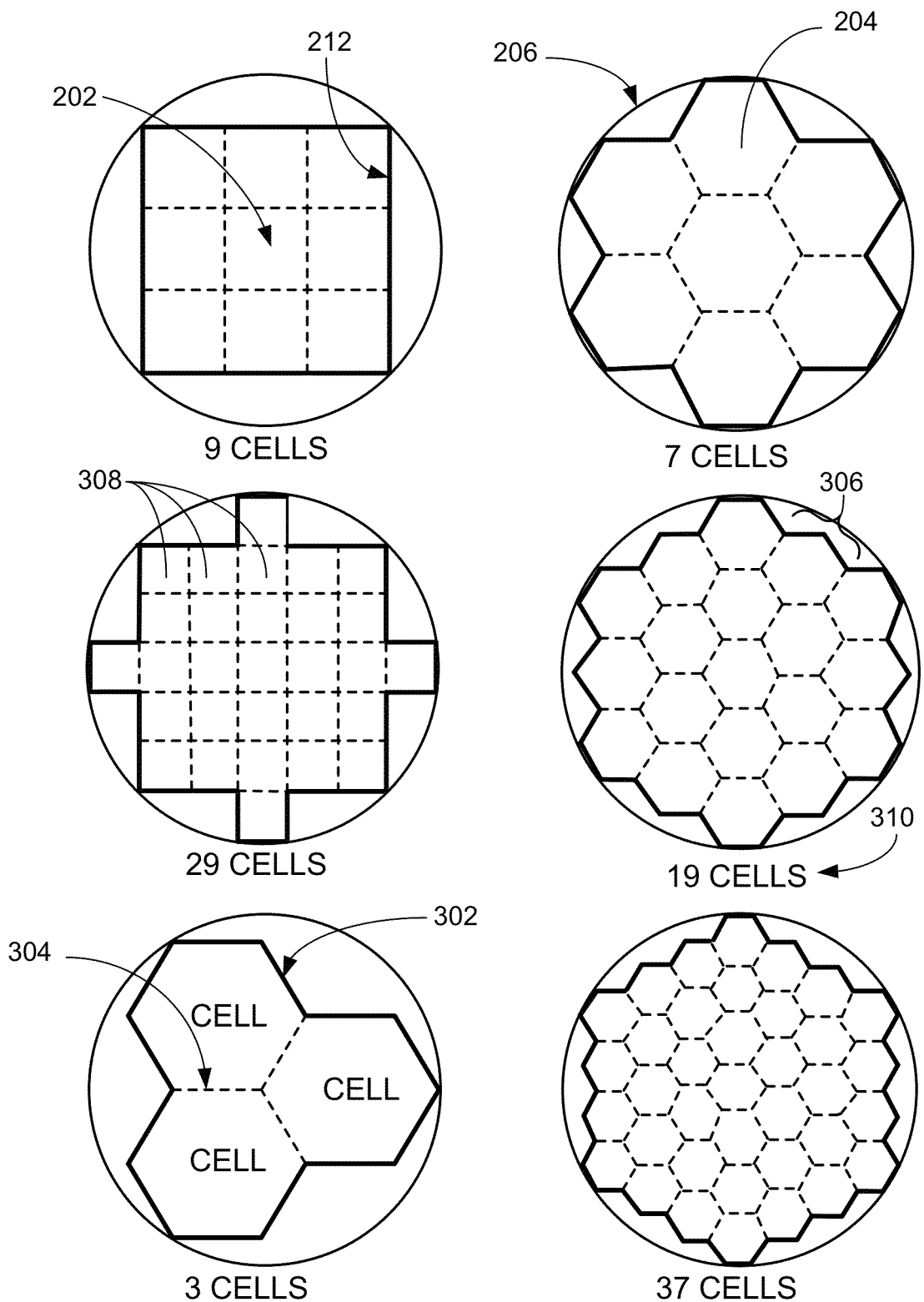
FIG. 3 is examples of a boundary shape of the grid area and a cell shape of the grid cell.

Referring now to FIG. 3, therein is shown examples of a boundary shape 302 of the grid area 202 and a cell shape 304 of the grid cell 204. The boundary shape 302 is a characteristic of an outline that establishes the grid boundary 212 of the grid area 202. The cell shape 304 a characteristic of an outline of the grid cell 204. For example, the union of a plurality of the grid cell 204 can establish the boundary shape 302 of the grid area 202.

The grid cell 204 can have a cell size 306. The cell size 306 is a spatial dimension of the grid cell 204. For example, the cell size 306 can determine a grid granularity 308 of the grid area 202. The grid granularity 308 is a coverage level by the grid cell 204 within the grid area 202. For example, the grid granularity 308 can be increased by increasing a cell size 306 of the grid cell 204. For a different example, the grid granularity 308 can be increased by increasing a cell count 310 of the grid cell 204.

For example, the cell shape 304, the cell size 306, or a combination thereof can determine the grid granularity 308 of the grid area 202. More specifically, the top left example of the grid area 202 can represent a 3 by 3 dimension of instances of the grid cell 204 with the cell shape 304 of a square. The bottom right example of the grid area 202 can represent 4 by 4 dimension of instances of the grid cell 204 with the cell shape 304 of hexagon. The grid granularity 308 of the bottom right example of the grid area 202 can be higher than the top left example of the grid area 202 because the cell size 306 of the grid cell 204 in the top left example can be greater than the cell size 306 of the grid cell 204 in the bottom right example. By increasing the grid granularity 308, the computing system 100 can generate the grid area 202 that can reflect the dimension of the approximation shape 206.

Figure 4:
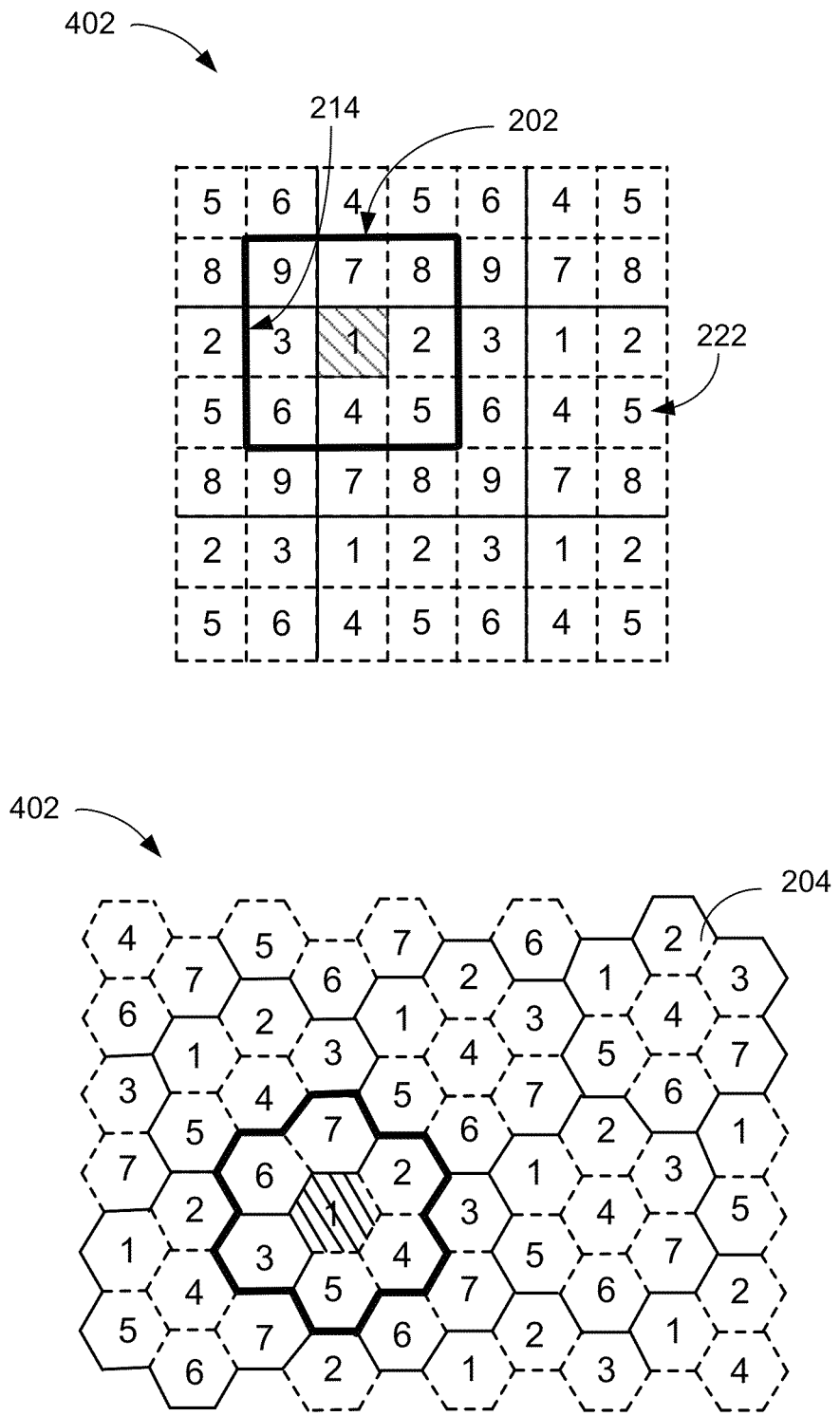
FIG. 4 is an example of a plurality of the grid area to cover a geographic region.

Referring now to FIG. 4, therein is shown an example of a plurality of the grid area 202 to cover a geographic region 402. The geographic region 402 can represent a surface of the Earth. One instance of the grid area 202 can be connected along the boundary side 214 of another instance of the grid area 202.

For the top example of the grid area 202, the grid area 202 can include 9 instances of the grid cell 204 labeled with the cell identification 222 from 1 to 9. Moreover, the cell shape 304 can represent a square. For the bottom example of the grid area 202, the grid area 202 can include 9 instances of the grid cell 204 labeled with the cell identification 222 from 1 to 9. Moreover, the cell shape 304 can represent a hexagon. The center of the grid area 202 can be denoted with an instance of the grid cell 204 being shaded.

Figure 5:
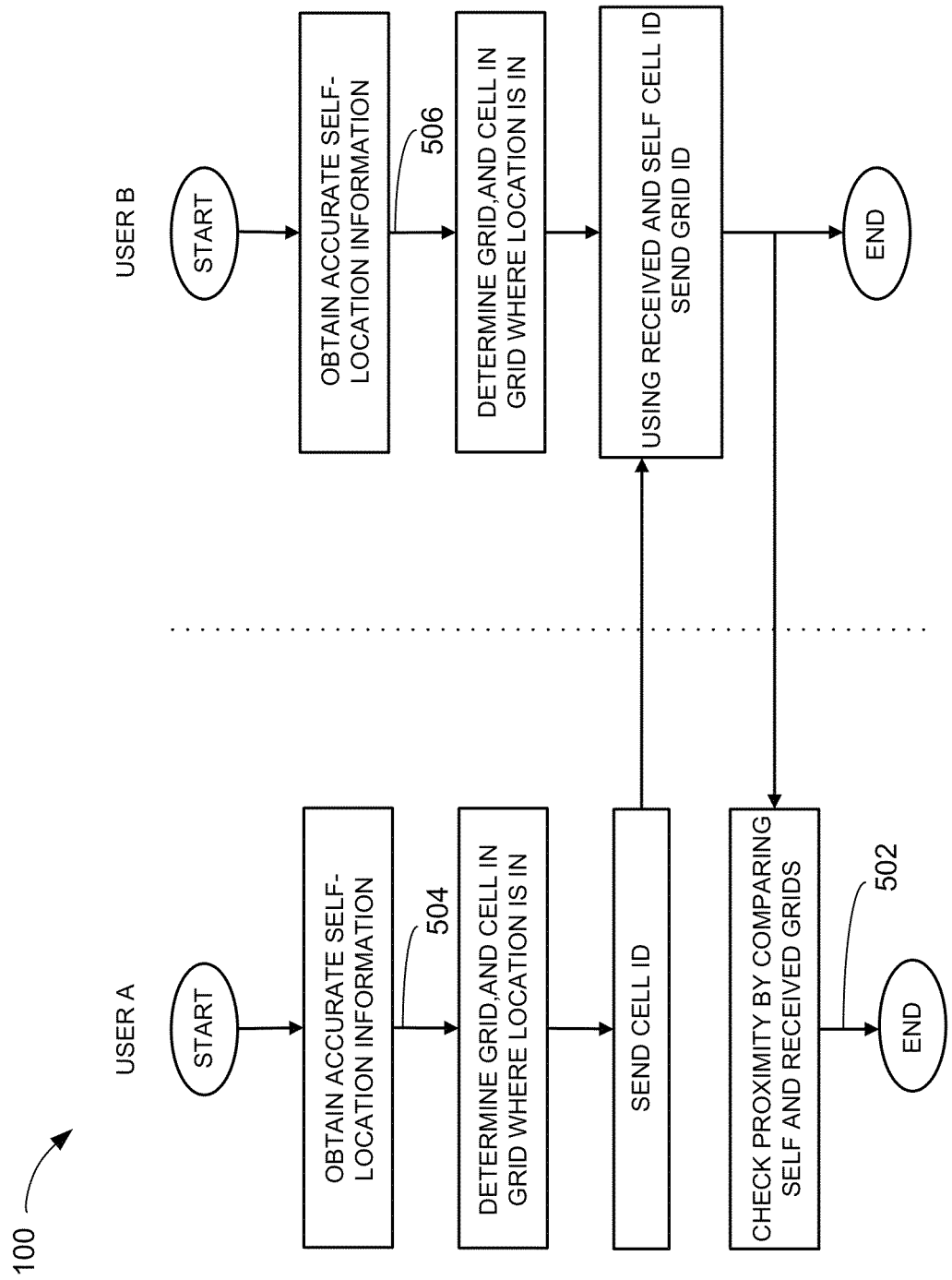
FIG. 5 is an example of a flow chart to generate a proximity result by the computing system.

Referring now to FIG. 5, therein is shown an example of a flow chart to generate a proximity result 502 by the computing system 100. The proximity result 502 is an outcome of whether the user B is near the user A. For example, if the user B is within the approximation shape 206 of FIG. 2 centered at the user A, the computing system 100 can determine that the user B is near the user A.

The computing system 100 can factor a current location A 504 and a current location B 506 to determine whether the user A and the user B are near each other. The current location A 504 is a physical location of the user A in the geographic region 402 of FIG. 4. The current location B 506 is a physical location of the user B in the geographic region 402. The current location A 504 and the current location B 506 can represent the GPS location, as an example, of the user A and the user B, respectively.

Figure 6:
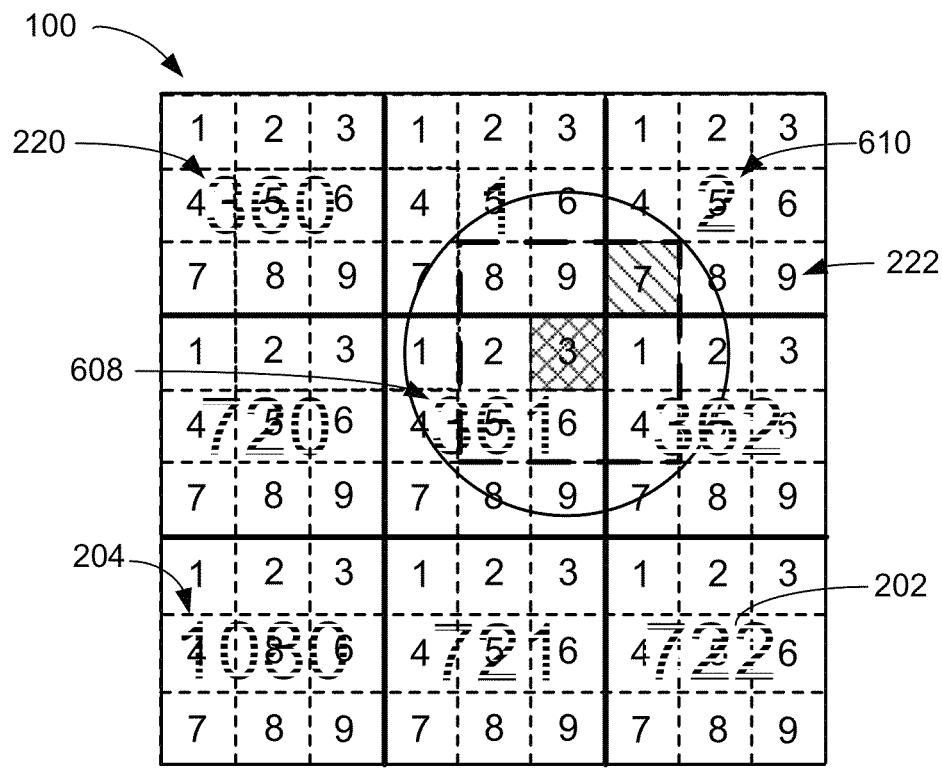
FIG. 6 is an example of a grid identification prediction.

Referring now to FIG. 6, therein is shown an example of a grid identification prediction 602. The grid identification prediction 602 is an estimation to determine the grid identification 220 where the current location A 504 of FIG. 5 is located. For example, in the top figure, the current location A 504 can be found within the grid area 202 with the grid identification 220 of "361." The current location B 506 of FIG. 5 can be found within the grid area 202 with the grid identification 220 of "2."

A cell location A 604 is the cell identification 222 of the grid cell 204 where the current location A 504 is found. A grid location A 608 is the grid identification 220 of the grid area 202 where the current location A 504 is found. A cell location B 606 is the cell identification 222 of the grid cell 204 where the current location B 506 is found. A grid location B 610 is the grid identification 220 of the grid area 202 where the current location B 506 is found. For example, the in the top figure, the cell location A 604 can represent the cell identification 222 of "3" and the cell location B 606 can represent the cell identification 222 of "7." For further example, the grid location A 608 can represent the grid area 202 with the grid identification 220 of "361" and the grid location B 610 can represent the grid area 202 with the grid identification 220 of "2."

For the top figure, the computing system 100 can generate the grid identification prediction 602 for the cell location A 604 as the grid identification 220 of "361" because the cell identification 222 of "3" nearest in physical distance to the cell location B 606 can belong in the grid area 202 with the grid identification 220 of "361." In this case, the computing system 100 has accurately predicted the grid identification prediction 602 as "361." The approximation shape 206 can be centered at the cell location A 604 for this example because the user A can be requesting whether the user B is near the user A.

In the bottom figure, the cell location A 604 can represent the cell identification 222 of "3" and the cell location B 606 can represent the cell identification 222 of "7" with both the cell location A 604 and the cell location B 606 can be within the grid area 202 with the grid identification 220 of "361." The computing system 100 can generate the grid identification prediction 602 for the cell identification 222 of "3" within the grid area 202 with the grid identification 220 of "1080." In this case, the computing system 100 failed to accurately predict the grid identification 220 as "361." As a result, the computing system 100 can determine that the user B is not near the user A.

Figure 7:
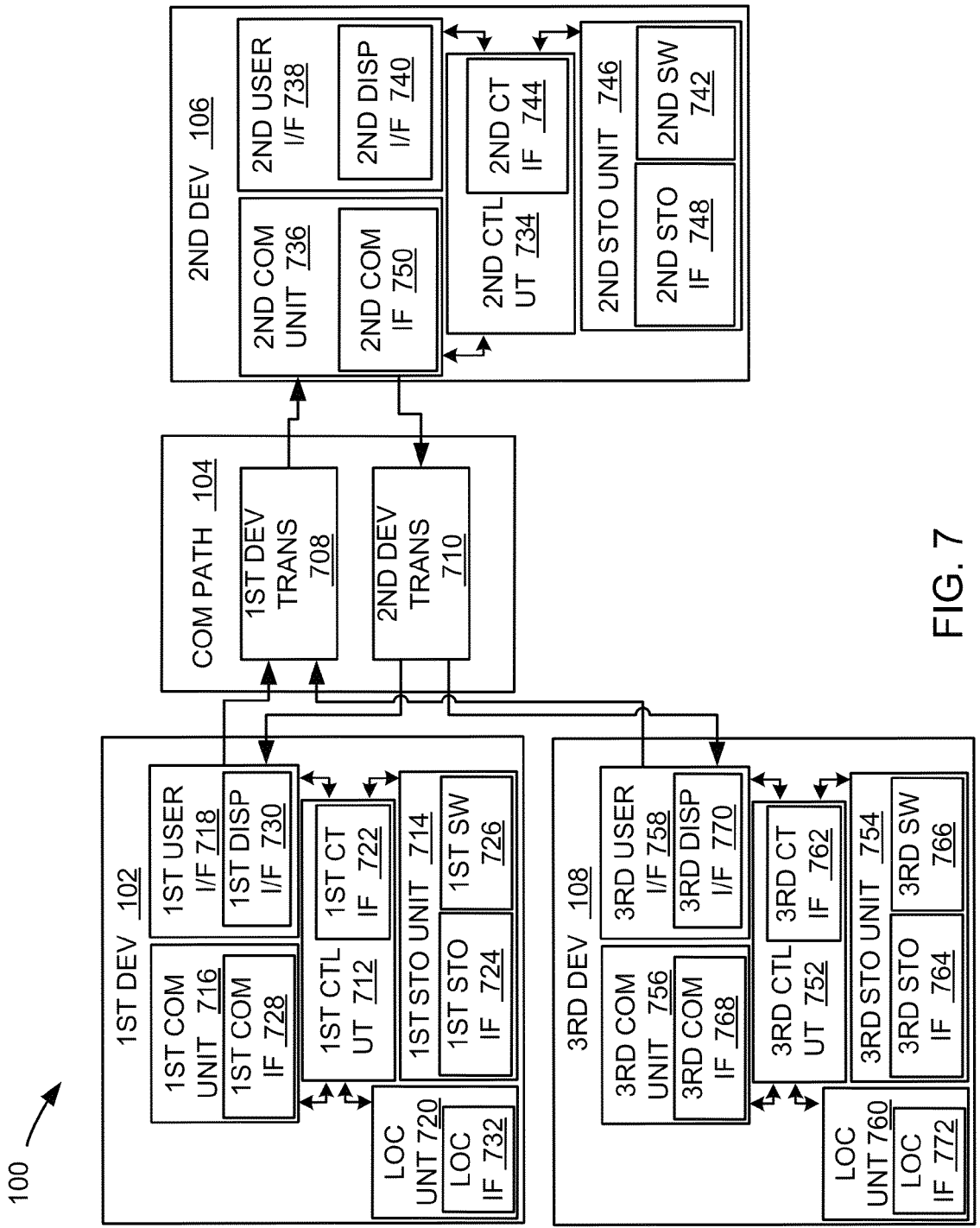
FIG. 7 is an exemplary block diagram of the computing system.

Referring now to FIG. 7, therein is shown an exemplary block diagram of the computing system 100. The computing system 100 can include the first device 102, the third device 108, the communication path 104, and the second device 106. The first device 102 or the third device 108 can send information in a first device transmission 708 over the communication path 104 to the second device 106. The second device 106 can send information in a second device transmission 710 over the communication path 104 to the first device 102 or the third device 108.

For illustrative purposes, the computing system 100 is shown with the first device 102 or the third device 108 as a client device, although it is understood that the computing system 100 can have the first device 102 or the third device 108 as a different type of device. For example, the first device 102 or the third device 108 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 or the third device 108 will be described as a client device and the second device 106 will be described as a server device. The embodiment of the present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the computing system 100.

The first control unit 712 can be implemented in a number of different manners. For example, the first control unit 712 can be a processor, an application specific integrated circuit (ASIC) an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate from to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate from the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof. The relevant information can also include news, media, events, or a combination thereof from the third party content provider.

The first storage unit 714 can be a volatile memory, a nonvolatile memory, an internal memory, an external memory, or a combination thereof. For example, the first storage unit 714 can be a nonvolatile storage such as nonvolatile random access memory (NVRAM), Flash memory, disk storage, or a volatile storage such as static random access memory (SRAM).

The first storage unit 714 can include a first storage interface 724. The first storage interface 724 can be used for communication between and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate from the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the first device 102 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, an infrared sensor for receiving remote signals, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the computing system 100. The first control unit 712 can also execute the first software 726 for the other functions of the computing system 100, including receiving location information from the location unit 720. The first control unit 712 can further execute the first software 726 for interaction with the communication path 104 via the first communication unit 716.

The second device 106 can be optimized for implementing the embodiment of the present invention in a multiple device embodiment with the second device 106. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the computing system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the computing system 100, including operating the second communication unit 736 to communicate with the second device 106 over the communication path 104.

The second control unit 734 can be implemented in a number of different manners. For example, the second control unit 734 can be a processor, an embedded processor, a microprocessor, hardware control logic, a hardware finite state machine (FSM), a digital signal processor (DSP), or a combination thereof.

The second control unit 734 can include a second control interface 744. The second control interface 744 can be used for communication between the second control unit 734 and other functional units in the second device 106. The second control interface 744 can also be used for communication that is external to the second device 106.

The second control interface 744 can receive information from the other functional units or from external sources, or can transmit information to the other functional units or to external destinations. The external sources and the external destinations refer to sources and destinations physically separate from the second device 106.

The second control interface 744 can be implemented in different ways and can include different implementations depending on which functional units or external units are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the computing system 100 is shown with the second storage unit 746 as a single hierarchy storage system, although it is understood that the computing system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate from the second device 106.

The second storage interface 748 can include different implementations depending on which functional units or external units are being interfaced with the second storage unit 746. The second storage interface 748 can be implemented with technologies and techniques similar to the implementation of the second control interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second control interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The computing system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The third device 108 can include a third control unit 752, a third storage unit 754, a third communication unit 756, a third user interface 758, and a location unit 760. The third control unit 752 can include a third control interface 762. The third control unit 752 can execute a third software 766 to provide the intelligence of the computing system 100. The third control unit 752 can be implemented in a number of different manners. For example, the third control unit 752 can be a processor, an embedded processor, a microprocessor, a hardware control logic, a hardware finite state machine (FSM), a digital signal processor (DSP), or a combination thereof. The third control interface 762 can be used for communication between the third control unit 752 and other functional units in the third device 108. The third control interface 762 can also be used for communication that is external to the third device 108.

The third control interface 762 can receive information from the other functional units or from external sources, or can transmit information to the other functional units or to external destinations. The external sources and the external destinations refer to sources and destinations physically separate to the third device 108.

The third control interface 762 can be implemented in different ways and can include different implementations depending on which functional units or external units are being interfaced with the third control interface 762. For example, the third control interface 762 can be implemented with a pressure sensor, an inertial sensor, a microelectromechanical system (MEMS), optical circuitry, waveguides, wireless circuitry, wireline circuitry, or a combination thereof.

The location unit 760 can generate location information, current heading, and current speed of the third device 108, as examples. The location unit 760 can be implemented in many ways. For example, the location unit 760 can function as at least a part of a global positioning system (GPS), an inertial navigation system, a cellular-tower location system, a pressure location system, or any combination thereof.

The location unit 760 can include a location interface 772. The location interface 772 can be used for communication between the location unit 760 and other functional units in the third device 108. The location interface 772 can also be used for communication that is external to the third device 108.

The location interface 772 can receive information from the other functional units or from external sources, or can transmit information to the other functional units or to external destinations. The external sources and the external destinations refer to sources and destinations physically separate to the third device 108.

The location interface 772 can include different implementations depending on which functional units or external units are being interfaced with the location unit 760. The location interface 772 can be implemented with technologies and techniques similar to the implementation of the third control interface 762.

The third storage unit 754 can store the third software 766. The third storage unit 754 can also store the relevant information, such as advertisements, points of interest (POI), navigation routing entries, or any combination thereof.

The third storage unit 754 can be a volatile memory, a nonvolatile memory, an internal memory, an external memory, or a combination thereof. For example, the third storage unit 754 can be a nonvolatile storage such as nonvolatile random access memory (NVRAM), Flash memory, disk storage, or a volatile storage such as static random access memory (SRAM).

The third storage unit 754 can include a third storage interface 764. The third storage interface 764 can be used for communication between the location unit 760 and other functional units in the third device 108. The third storage interface 764 can also be used for communication that is external to the third device 108.

The third storage interface 764 can receive information from the other functional units or from external sources, or can transmit information to the other functional units or to external destinations. The external sources and the external destinations refer to sources and destinations physically separate to the third device 108.

The third storage interface 764 can include different implementations depending on which functional units or external units are being interfaced with the third storage unit 754. The third storage interface 764 can be implemented with technologies and techniques similar to the implementation of the third control interface 762.

The third communication unit 756 can enable external communication to and from the third device 108. For example, the third communication unit 756 can permit the third device 108 to communicate with the second device 106 of FIG. 1, an attachment, such as a peripheral device or a computer desktop, and the communication path 104.

The third communication unit 756 can also function as a communication hub allowing the third device 108 to function as part of the communication path 104 and not limited to be an end point or terminal unit to the communication path 104. The third communication unit 756 can include active and passive components, such as microelectronics or an antenna, for interaction with the communication path 104.

The third communication unit 756 can include a third communication interface 768. The third communication interface 768 can be used for communication between the third communication unit 756 and other functional units in the third device 108. The third communication interface 768 can receive information from the other functional units or can transmit information to the other functional units.

The third communication interface 768 can include different implementations depending on which functional units are being interfaced with the third communication unit 756. The third communication interface 768 can be implemented with technologies and techniques similar to the implementation of the third control interface 762.

The third user interface 758 allows a user (not shown) to interface and interact with the third device 108. The third user interface 758 can include an input device and an output device. Examples of the input device of the third user interface 758 can include a keypad, a touchpad, soft-keys, a keyboard, a microphone, or any combination thereof to provide data and communication inputs.

The third user interface 758 can include a third display interface 770. The third display interface 770 can include a display, a projector, a video screen, a speaker, or any combination thereof.

The third control unit 752 can operate the third user interface 758 to display information generated by the computing system 100. The third control unit 752 can also execute the third software 766 for the other functions of the computing system 100, including receiving location information from the location unit 760. The third control unit 752 can further execute the third software 766 for interaction with the communication path 104 via the third communication unit 756.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the computing system 100 is described by operation of the first device 102, the second device 106, and the third device 108. It is understood that the first device 102, the second device 106, the third device 108 can operate any of the modules and functions of the computing system 100. For example, the first device 102 is described to operate the location unit 720, although it is understood that the second device 106 or the third device 108 can also operate the location unit 720.

Figure 8:
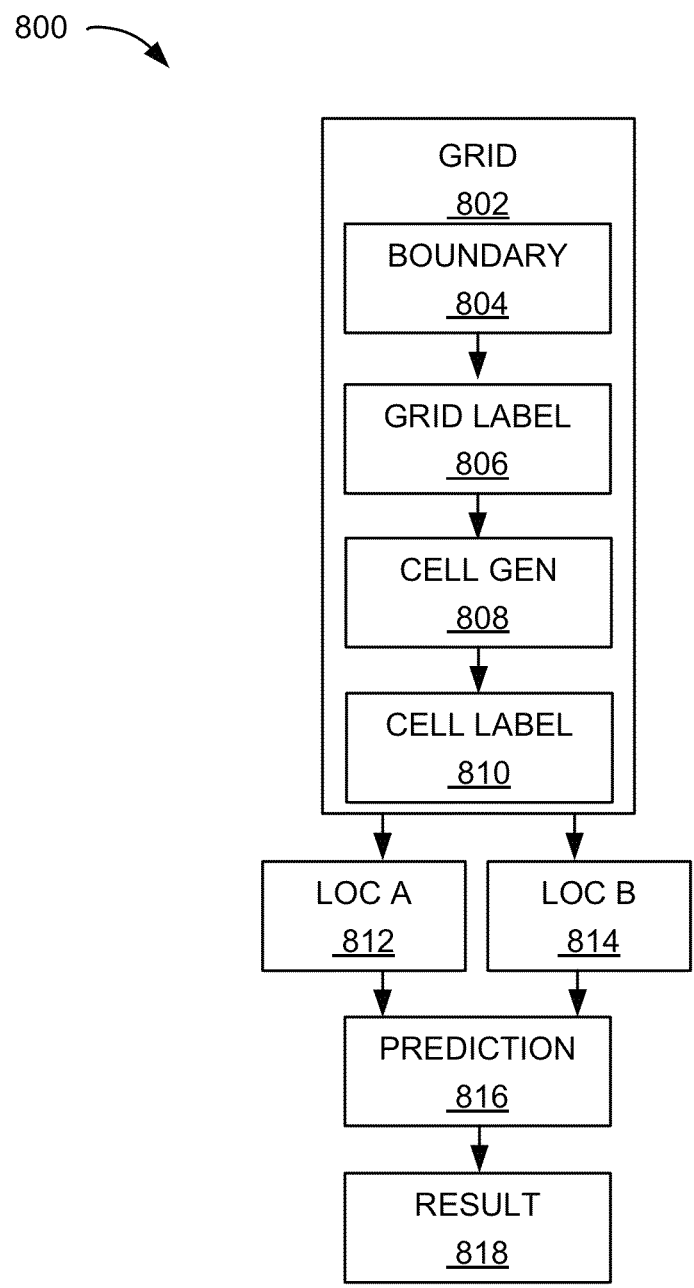
FIG. 8 is a control flow of the computing system.

Referring now to FIG. 8, therein is shown a control flow 800 of the computing system 100. The computing system 100 can include a grid module 802. The grid module 802 generates the grid area 202 of FIG. 2. For example, the grid module 802 can generate the grid area 202 based on the grid boundary 212 of FIG. 2, the grid cell 204 of FIG. 2, or a combination thereof. More specifically, the grid module 802 can generate the grid area 202 based on establishing the grid boundary 212 with the latitude information 208 of FIG. 2, the longitude information 210 of FIG. 2, or a combination thereof.

The grid module 802 can generate the grid area 202 in a number of ways. The grid module 802 can include a boundary module 804. The boundary module 804 determines the grid boundary 212. For example, the boundary module 804 can determine the grid boundary 212 based on the latitude information 208, the longitude information 210, the boundary shape 302 of FIG. 3, or a combination thereof.

The boundary module 804 can determine the grid boundary 212 in a number of ways. For example, the boundary module 804 can determine the grid boundary 212 having the boundary shape 302 of a polygon representing a square, rectangle, or a combination thereof. More specifically, the boundary module 804 can determine the boundary shape 302 of the grid boundary 212 based on the latitude information 208, the longitude information 210, or a combination thereof.

For a specific example, the boundary module 804 can determine the grid boundary 212 by segmenting the surface of Earth, the geographic region 402 of FIG. 4, or a combination thereof according to the latitude information 208, the longitude information 210, or a combination thereof. More specifically, the boundary module 804 can establish the boundary side 214 of FIG. 2 starting from North Pole of Earth and $0^{th}$ degree longitude of the longitude information 210 until reaching the South Pole of Earth.

Furthermore, the boundary module 804 can establish the grid width 216 of FIG. 2 by establishing the boundary side 214 as discussed for $0^{th}$ degree longitude by establishing the boundary side 214 at $1^{st}$ degree longitude of the longitude information 210. The boundary module 804 can segment the surface of Earth to establish the boundary side 214 of the grid boundary 212 by segmenting the surface longitudinally 1 degree at a time from $0^{th}$ degree longitude of the longitude information 210 until reaching $180^{th}$ degree longitude or −180$^{th}$ degree longitude of the longitude information 210. The boundary module 804 can segment the surface longitudinally at less than or greater than 1 degree at a time.

For further example, the boundary module 804 can establish the grid height 218 of FIG. 2 similarly as the grid width 216 but based on the latitude information 208. More specifically, the boundary module 804 can establish the grid height 218 by establishing the boundary side 214 along the 0$^{th}$ degree latitude of the latitude information 208. Furthermore, the boundary module 804 can segment the surface of Earth to establish the boundary side 214 of the grid boundary 212 by segmenting the surface 1 degree at a time from 0$^{th}$ degree latitude of the latitude information 208 until reaching 90 degree latitude or −90$^{th}$ degree latitude of the latitude information 208. The boundary module 804 can segment the surface along the latitude information 208 at less than or greater than 1 degree at a time.

For further example, the boundary module 804 can determine the grid boundary 212 of the grid area 202 based on a plurality of instances of the boundary side 214 establishing the grid height 218 and a plurality of another instances of the boundary side 214 establishing the grid width 216. More specifically, by segmenting the surface of Earth along each degree of the latitude information 208 and the longitude information 210, the boundary module 804 can determine the grid boundary 212 having the boundary shape 302 of polygon representing a square, a rectangle, or a combination thereof. The boundary module 804 can communicate the grid boundary 212 to a grid label module 806.

The grid module 802 can include the grid label module 806, which can couple to the boundary module 804. The grid label module 806 generates the grid identification 220 of FIG. 2. For example, the grid label module 806 can generate the grid identification 220 for labeling the grid area 202.

For a specific example, the grid label module 806 can generate the grid identification 220 for labeling each instances of the grid area 202 with the grid boundary 212. More specifically, starting from the grid boundary 212 established between 0$^{th}$ and 1$^{st}$ degree of the longitude information 210 and 90$^{th}$ and 89$^{th}$ degree of the latitude information 208, the grid label module 806 can generate the grid identification 220 representing a numeric value, such as number "1."

Subsequently, starting from the grid boundary 212 established between 1$^{st}$ and 2$^{nd}$ degree of the longitude information 210 and 90$^{th}$ and 89$^{th}$ degree of the latitude information 208, the grid label module 806 can generate the grid identification 220 as number "2." The grid label module 806 can generate a unique instance of the grid identification 220 for each instances of the grid area 202 with the grid boundary 212 that segments the surface of Earth. For example, starting from the grid boundary 212 established between −179$^{th}$ and 0$^{th}$ degree of the longitude information 210 and 89$^{th}$ and 88$^{th}$ degree of the latitude information 208, the grid label module 806 can generate the grid identification 220 as number "721." For a different example, the grid label module 806 can generate the grid identification 220 representing other than numeric value, such as alphabet value or alphanumeric value. The grid label module 806 can communicate the grid identification 220 to a cell generator module 808.

The grid module 802 can include the cell generator module 808, which can couple to the grid label module 806. The cell generator module 808 generates the grid cell 204. For example, the cell generator module 808 can generate the grid cell 204 based on the grid boundary 212, the grid granularity 308 of FIG. 3, the cell shape 304 of FIG. 3, the cell size 306 of FIG. 3.

The cell generator module 808 can generate the grid cell 204 in a number of ways. For example, the cell generator module 808 can generate the grid cell 204 based on the grid boundary 212. More specifically, the grid boundary 212 can have the boundary shape 302 of a square. Based on the boundary shape 302, the cell generator module 808 can generate the grid cell 204 having the cell shape 304 of a square by segmenting the surface within the grid area 202. More specifically, the cell generator module 808 can segment the grid area 202 north/south and east/west to generate the grid cell 204 having the cell shape 304 of a square.

For further example, the cell generator module 808 can change the cell size 306 of the grid cell 204 to change, such as increase or decrease, the grid granularity 308 to build the grid area 202. More specifically, the cell generator module 808 can increase the cell size 306 to decrease the grid granularity 308 and decrease the cell size 306 to increase the grid granularity 308. For example, by increasing the cell size 306, the cell count 310 of FIG. 3 of the grid cell 204 that can fit within the grid boundary 212 can decrease. In contrast, by decreasing the cell size 306, the cell count 310 of the grid cell 204 can fit within the grid boundary 212 can increase.

For a specific example, the cell shape 304 can represent a square. To have the cell count 310 of 9 within the grid area 202, the cell generator module 808 can determine the grid granularity 308 representing a 3 by 3 square dimension of instances of the grid cell 204. To increase the cell count 310 to 25, the cell generator module 808 can determine the grid granularity 308 representing a 5 by 5 square dimension of instances of the grid cell 204 for building the grid area 202 with a smaller instance of the cell size 306.

For a different example, the cell generator module 808 can generate the grid cell 204 having the cell shape 304 of a polygon other than a square. For example, the cell generator module 808 can generate the grid cell 204 having the cell shape 304 of a hexagon. For further example, to have the cell count 310 of 37 within the grid area 202, the cell generator module 808 can determine the grid granularity 308 representing a 4 by 4 hexagon dimension of instances of the grid cell 204. The cell generator module 808 can communicate the grid cell 204 to a cell label module 810.

It has been discovered that the computing system 100 can change the grid granularity 308 to improve the accuracy of determining whether the current location A 504 of FIG. 5 and the current location B 506 of FIG. 5 are nearby. By increasing the grid granularity 308, the computing system 100 can determine the current location A 504 and the current location B 506 more accurately because the cell size 306 of the grid cell 204 where the current location A 504 and the current location B 506 will be smaller. As a result, the computing system 100 can improve the accuracy of determining the current location A 504 and the current location B 506 to more exact to determine where the user A and the user B are located.

The grid module 802 can include the cell label module 810, which can couple to the cell generator module 808. The cell label module 810 generates the cell identification 222 of FIG. 2. For example, the cell label module 810 can generate the cell identification 222 for labeling the grid cell 204 with the cell identification 222. More specifically, the cell label module 810 can generate the cell identification 222 based on the cell count 310 of the grid cell 204 within the grid area 202.

As discussed previously, if the grid granularity 308 of the grid area 202 represents 3 by 3 dimension of instances of the grid cell 204, the cell label module 810 can generate the cell identification 222 representing a numeric value from 1 to 9. More specifically, the cell label module 810 can generate the cell identification 222 to label the grid cell 204 with the cell identification 222 from left to right and top to bottom in order. For a different example, the cell label module 810 can generate the cell identification 222 representing other than numeric value, such as alphabet value or alphanumeric value. The cell label module 810 can communicate the cell identification 222 to a location A module 812, a location B module 814, or a combination thereof.

For illustrative purposes, the computing system 100 is described with the boundary module 804 determining the boundary shape 302 of the grid boundary 212 based on the latitude information 208, the longitude information 210, or a combination thereof, although it is understood that the boundary module 804 can operate differently. For example, the boundary module 804 can determine the boundary shape 302 based on the union of a plurality of the grid cell 204 for building the grid area 202.

As discussed previously, if the cell shape 304 is a square, the boundary module 804 can determine the boundary shape 302 of a square by connecting a plurality of the grid cell 204 to build a square. For a different example, even if the cell shape 304 is a square, the boundary module 804 can determine the boundary shape 302 different from a square. As illustrated in middle left figure of FIG. 3, by decreasing the cell size 306, the union of the grid cell 204 can build the boundary shape 302 of a square having a protrusion created by an extra instance of the grid cell 204 on each sides of the grid boundary 212 representing a square. For another example, the boundary module 804 can determine the boundary shape 302 based on connecting a plurality of the grid cell 204 with the cell shape 304 representing a hexagon. Moreover, the boundary module 804 can determine the boundary shape 302 to determine the grid area 202 for generating the approximation shape 206.

The computing system 100 can include the location A module 812, which can couple to the grid module 802. The location A module 812 determines the cell location A 604 of FIG. 6, the grid location A 608 of FIG. 6, or a combination thereof. For example, the location A module 812 can determine the cell location A 604 based on the current location A 504.

For a specific example, the location A module 812 can determine the cell location A 604 with the location unit 720 of FIG. 7. More specifically, the location A module 812 can determine the cell location A 604 based on comparing the GPS fix of the current location A 504 to the corresponding instance of the cell identification 222. As a result, the location A module 812 can determine the cell location A 604 to represent the cell identification 222 where the current location A 504 is located.

For further example, the location A module 812 can determine the grid location A 608 based on the cell location A 604 determined. More specifically, by determining the cell identification 222 where the current location A 504 is located, the location A module 812 can determine the grid identification 220 of the grid area 202 where the cell identification 222 is found. As a result, the location A module 812 can determine the grid location A 608 representing the grid identification 220 of where the current location A 504 is located. The location A module 812 can communicate the cell location A 604 without the grid location A 608 to a prediction module 816.

The computing system 100 can include the location B module 814, which can couple to the grid module 802. The location B module 814 determines the cell location B 606 of FIG. 6, the grid location B 610 of FIG. 6, or a combination thereof. For example, the location B module 814 can determine the cell location B 606 based on the current location B 506.

For a specific example, the location B module 814 can determine the cell location B 606 with the location unit 760 of FIG. 7. More specifically, the location B module 814 can determine the cell location B 606 based on comparing the GPS fix of the current location B 506 to the corresponding instance of the cell identification 222. As a result, the location B module 814 can determine the cell location B 606 to represent cell identification 222 where the current location B 506 is located.

For further example, the location B module 814 can determine the grid location B 610 based on the cell location B 606 determined. More specifically, by determining the cell identification 222 where the current location B 506 is located, the location B module 814 can determine the grid identification 220 of the grid area 202 where the cell identification 222 is found. As a result, the location B module 814 can determine the grid location B 610 representing the grid identification 220 of where the current location B 506 is located. The location B module 814 can communicate the cell location B 606 with the grid location B 610 to the prediction module 816.

The computing system 100 can include the prediction module 816, which can couple to the location A module 812, the location B module 814, or a combination thereof. The prediction module 816 generates the grid identification prediction 602 of FIG. 6. For example, the prediction module 816 can generate the grid identification prediction 602 based on comparing the cell location A 604 and the cell location B 606.

More specifically, the prediction module 816 can generate the grid identification prediction 602 based on predicting the grid identification 220 where the cell location A 604 is located. As stated previously, the grid location A 608 is not communicated with the cell location A 604. Based on the cell location A 604, the prediction module 816 can determine the cell identification 222 of the cell location A 604 but cannot determine the grid identification 220 of where the cell location A 604 can be located.

As a result, the prediction module 816 can generate the grid identification prediction 602 based on predicting the grid identification 220 where the cell location A 604 can locate by identifying the cell identification 222 nearest to the cell location B 606. The nearest can represent a physical distance between the cell location A 604 and the cell location B 606, the shortest amount of travel time between the cell location A 604 and the cell location B 606, or a combination thereof.

For a specific example, as illustrated in FIG. 6, the cell location A 604 can reside in grid location A 608 representing the grid identification 220 of "361." The cell identification 222 of the cell location A 604 can represent "3." The cell location B 606 can reside in the grid location B 610 representing the grid identification 220 of "2." The cell identification 222 of the cell location B 606 can represent "7." The prediction module 816 can generate the grid identification prediction 602 of "361" based on identifying the nearest instance of the cell identification 222 for the cell location A 604 as "3" in the grid identification of "361."

For a different example, the cell location A 604 can reside in grid location A 608 representing the grid identification 220 of "361." The cell identification 222 of the cell location A 604 can represent "3." The cell location B 606 can reside in the grid location B 610 representing the grid identification 220 of "361." The cell identification 222 of the cell location B 606 can represent "7." The prediction module 816 can generate the grid identification prediction 602 of "1080" based on identifying the nearest instance of the cell identification 222 for the cell location A 604 as "3" in the grid identification 220 of "1080." The prediction module 816 can communicate the grid identification prediction 602 to a result module 818.

The computing system 100 can include the result module 818, which can couple to the prediction module 816. The result module 818 generates the proximity result 502 of FIG. 5. For example, the result module 818 can generate the proximity result 502 based on comparing the grid identification prediction 602 to the grid location A 608.

The result module 818 can generate the proximity result 502 in a number of ways. As discussed previously, the grid identification prediction 602 can represent "361." The grid identification 220 for the grid location A 608 can also represent "361." As a result, the result module 818 can generate the proximity result 502 that the current location A 504 and the current location B 506 are nearby based on the grid identification prediction 602 matching the grid location A 608. Moreover, the result module 818 can generate the proximity result 502 of "nearby" even though the current location A 504 and the current location B 506 are located in different instances of the grid identification 220, "361" for the current location A 504 and "2" for the current location B 506.

For a different example, as discussed previously, the grid identification prediction 602 can represent "1080." The grid identification 220 for the grid location A 608 can represent "361." As a result, the result module 818 can generate the proximity result 502 that the current location A 504 and the current location B 506 are not nearby because the grid identification prediction 602 did not match the grid identification 220 of the grid location A 608.

It has been discovered that the computing system 100 can generate the proximity result 502 to improve the accuracy of determining whether the current location A 504 and the current location B 506 are nearby without disclosing the exact location of the grid location A 608 to the user B. By generating the proximity result 502, the computing system 100 can perform a single comparison between the grid identification prediction 602 and the grid location A 608 without depending on the approximation shape 206 to assume the grid area 202 to cover the comparison space evenly. As a result, the computing system 100 can optimize the private equality testing by improving the accuracy without compromising the privacy of the user A.

The physical transformation for determining the cell location A 604, the cell location B 606, or a combination thereof results in results in the movement in the physical world, such as people using the first device 102, based on the operation of the computing system 100. As the movement in the physical world occurs, the movement itself creates additional information that is converted back into generating the grid identification prediction 602, the proximity result 502, or a combination thereof for the continued operation of the computing system 100 and to continue movement in the physical world.

The first software 726 of FIG. 7 of the first device 102 of FIG. 7 can include the computing system 100. For example, the first software 726 can include the grid module 802, the location A module 812, the location B module 814, the prediction module 816, and the result module 818.

The first control unit 712 of FIG. 7 can execute the first software 726 for the grid module 802 to generate the grid area 202. The first control unit 712 can execute the first software 726 for the location A module 812 to determine the cell location A 604. The first control unit 712 can execute the first software 726 for the location B module 814 to determine the cell location B 606. The first control unit 712 can execute the first software 726 for the prediction module 816 to generate the grid identification prediction 602. The first control unit 712 can execute the first software 726 for the result module 818 to generate the proximity result 502.

The second software 742 of FIG. 7 of the second device 106 of FIG. 7 can include the computing system 100. For example, the second software 742 can include the grid module 802, the location A module 812, the location B module 814, the prediction module 816, and the result module 818.

The second control unit 734 of FIG. 7 can execute the second software 742 for the grid module 802 to generate the grid area 202. The second control unit 734 can execute the second software 742 for the location A module 812 to determine the cell location A 604. The second control unit 734 can execute the second software 742 for the location B module 814 to determine the cell location B 606. The second control unit 734 can execute the second software 742 for the prediction module 816 to generate the grid identification prediction 602. The second control unit 734 can execute the second software 742 for the result module 818 to generate the proximity result 502.

The third software 766 of FIG. 7 of the third device 108 of FIG. 7 can include the computing system 100. For example, the third software 766 can include the grid module 802, the location A module 812, the location B module 814, the prediction module 816, and the result module 818.

The third control unit 752 of FIG. 7 can execute the third software 766 for the grid module 802 to generate the grid area 202. The third control unit 752 can execute the third software 766 for the location A module 812 to determine the cell location A 604. The third control unit 752 can execute the third software 766 for the location B module 814 to determine the cell location B 606. The third control unit 752 can execute the third software 766 for the prediction module 816 to generate the grid identification prediction 602. The third control unit 752 can execute the third software 766 for the result module 818 to generate the proximity result 502.

The computing system 100 can be partitioned between the first software 726, the second software 742, and the third software 766. For example, the second software 742 can include the grid module 802, the prediction module 816, and the result module 818. The second control unit 734 can execute modules partitioned on the second software 742 as previously described.

The first software 726 can include the location A module 812. Based on the size of the first storage unit 714 of FIG. 7, the first software 726 can include additional modules of the computing system 100. The first control unit 712 can execute the modules partitioned on the first software 726 as previously described.

The third software 766 can include the location B module 814. Based on the size of the third storage unit 754 of FIG. 7, the third software 766 can include additional modules of the computing system 100. The third control unit 752 can execute the modules partitioned on the third software 766 as previously described.

The first control unit 712 can operate the first communication unit 716 of FIG. 7 to communicate the grid area 202, the cell location A 604, the cell location B 606, the grid identification prediction 602, the proximity result 502, or a combination thereof to or from the second device 106, the third device 108, or a combination thereof. The first control unit 712 can operate the first software 726 to operate the location unit 720 of FIG. 7. The second control unit 734 can operate the second communication unit 736 of FIG. 7 to communicate the grid area 202, the cell location A 604, the cell location B 606, the grid identification prediction 602, the proximity result 502, or a combination thereof to or from the first device 102, the third device 108, or a combination thereof through the communication path 104 of FIG. 7. The third control unit 752 can operate the third communication unit 756 of FIG. 7 to communicate the grid area 202, the cell location A 604, the cell location B 606, the grid identification prediction 602, the proximity result 502, or a combination thereof to or from the first device 102, the second device 106, or a combination thereof through the communication path 104 of FIG. 7.

The computing system 100 describes the module functions or order as an example. The modules can be partitioned differently. For example, the prediction module 816 and the result module 818 can be combined. Each of the modules can operate individually and independently of the other modules. Furthermore, data generated in one module can be used by another module without being directly coupled to each other. For example, the prediction module 816 can receive the grid area 202 from the grid module 802. Further, one module communicating to another module can represent one module sending, receiving, or a combination thereof the data generated to or from another module.

The modules described in this application can be hardware implementation or hardware accelerators in the first control unit 712, the third control unit 752, or in the second control unit 734. The modules can also be hardware implementation or hardware accelerators within the first device 102, the second device 106, or the third device 108 but outside of the first control unit 712, the second control unit 734, or the third control unit 752, respectively as depicted in FIG. 7. However, it is understood that the first device 102, the second device 106, the third device 108, or a combination thereof can collectively refer to all hardware accelerators for the modules. Furthermore, the first device 102, the second device 106, the third device 108, or a combination thereof can be implemented as software, hardware, or a combination thereof.

The modules described in this application can be implemented as instructions stored on a non-transitory computer readable medium to be executed by the first device 102, the second device 106, the third device 108, or a combination thereof. The non-transitory computer medium can include the first storage unit 714, the second storage unit 746 of FIG. 7, the third storage unit 754, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The control flow 800 of a method 800 of operation of a computing system 100 in an embodiment of the present invention. The method 800 includes: communicating a cell location A without a grid location A for identifying one of grid cells where a current location A is located in a block 802; communicating a cell location B with a grid location B for identifying one of grid areas with one of the grid cells where a current location B is located in a block 804; generating a grid identification prediction based on predicting a grid identification of one of the grid areas where the cell location A is located nearest to the cell location B in a block 806; and generating a proximity result with a control unit based on the grid identification prediction matching the grid location A for determining whether the current location A is near the current location B in a block 808.

It has been discovered that the computing system 100 generating the proximity result 502 can improve the accuracy and reduce the computation cost from performing the private equality testing. By generating the grid identification prediction 602 for predicting the grid identification 220 of the grid area 202 where the cell location 604 is located nearest to the cell location B 606, the computing system 100 can perform just a single comparison to generate the proximity result 502. As a result, the computing system 100 can improve the accuracy and efficiency without compromising the user's privacy for safer operation of the computing system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
 a communication unit including a microelectronic configured to:
  communicate a cell location A without a grid location A for identifying one of grid cells where a current location A is located,
  communicate a cell location B with a grid location B for identifying one of grid areas with one of the grid cells where a current location B is located, and
 a control unit including a processor, coupled to the communication unit, configured to:
  generate a grid identification prediction based on predicting a grid identification of one of the grid areas where the cell location A is located nearest to the cell location B, and
  generate a proximity result based on the grid identification prediction matching the grid location A for determining whether the current location A is near the current location B.

2. The system as claimed in claim 1 wherein the control unit is configured to generate the grid areas based on establishing a grid boundary for each one of the grid areas with latitude information, longitude information, or a combination thereof.

3. The system as claimed in claim 1 wherein the control unit is configured to generate the grid cells based on segmenting each of the grid areas.

4. The system as claimed in claim 1 wherein the control unit is configured to change a cell size of the grid cells for changing a grid granularity of the grid areas.

5. The system as claimed in claim 1 wherein the control unit is configured to determine a boundary shape of a grid boundary of the grid areas based on a cell shape of the grid cells.

6. A computing system comprising:
 a communication unit including a microelectronic configured to:

communicate a cell location A without a grid location A for identifying one of grid cells where a current location A is located, communicate a grid identification prediction of a grid identification of one of grid areas where the cell location A is located nearest to a cell location B, and a control unit including a processor, coupled to the communication unit, configured to:

generate a proximity result based on the grid identification prediction matching the grid location A for determining whether the current location A is near a current location B.

7. The system as claimed in claim 6 wherein the control unit is configured to determine the cell location A with the grid location A for identifying one of the grid areas with one of the grid cells where the current location A is located.

8. The system as claimed in claim 6 wherein the control unit is configured to determine the cell location A based on identifying a cell identification of one of the grid cells where the current location A is located.

9. The system as claimed in claim 6 wherein the control unit is configured to determine the grid identification of one of the grid areas where the current location A is located.

10. The system as claimed in claim 6 wherein the control unit is configured to generate the proximity result based on comparing the grid identification prediction to the grid identification of one of the grid areas where the cell location A is located.

11. A computing system comprising:

a communication unit including a microelectronic configured to:

communicate a cell location A without a grid location A for identifying one of grid cells where a current location A is located, and a control unit including a processor, coupled to the communication unit, configured to:

determine a cell location B with a grid location B for identifying one of grid areas with one of the grid cells where a current location B is located, and generate a grid identification prediction based on predicting a grid identification of one of the grid areas where the cell location A is located nearest to the cell location B.

12. The system as claimed in claim 11 wherein the control unit is configured to determine the cell location B based on identifying a cell identification of one of the grid cells where the current location B is located.

13. The system as claimed in claim 11 wherein the control unit is configured to determine the grid identification of one of the grid areas where the current location B is located.

14. The system as claimed in claim 11 wherein the control unit is configured to generate the grid identification prediction based on comparing the cell location A and the cell location B for predicting the grid identification of one of the grid areas where the cell location A is located.

15. The system as claimed in claim 11 wherein the control unit is configured to predict the grid identification where the cell location A is located by identifying a cell identification nearest to the cell location B.

16. A method of operation of a computing system comprising:

communicating a cell location A without a grid location A for identifying one of grid cells where a current location A is located;

communicating a cell location B with a grid location B for identifying one of grid areas with one of the grid cells where a current location B is located;

generating a grid identification prediction based on predicting a grid identification of one of the grid areas where the cell location A is located nearest to the cell location B; and generating a proximity result with a control unit based on the grid identification prediction matching the grid location A for determining whether the current location A is near the current location B.

17. The method as claimed in claim 16 further comprising generating the grid areas based on establishing a grid boundary for each one of the grid areas with latitude information, longitude information, or a combination thereof.

18. The method as claimed in claim 16 further comprising generating the grid cells based on segmenting each of the grid areas.

19. The method as claimed in claim 16 further comprising changing a cell size of the grid cells for changing a grid granularity of the grid areas.

20. The method as claimed in claim 16 further comprising determining a boundary shape of a grid boundary of the grid areas based on a cell shape of the grid cells.

21. A non-transitory computer readable medium comprising:

communicating a cell location A without a grid location A for identifying one of grid cells where a current location A is located;

communicating a cell location B with a grid location B for identifying one of grid areas with one of the grid cells where a current location B is located;

generating a grid identification prediction based on predicting a grid identification of one of the grid areas where the cell location A is located nearest to the cell location B; and generating a proximity result based on the grid identification prediction matching the grid location A for determining whether the current location A is near the current location B.

22. The non-transitory computer readable medium as claimed in claim 21 wherein generating the grid areas based on establishing a grid boundary for each one of the grid areas with latitude information, longitude information, or a combination thereof.

23. The non-transitory computer readable medium as claimed in claim 21 wherein generating the grid cells based on segmenting each of the grid areas.

24. The non-transitory computer readable medium as claimed in claim 21 wherein changing a cell size of the grid cells for changing a grid granularity of the grid areas.

25. The non-transitory computer readable medium as claimed in claim 21 further comprising determining a boundary shape of a grid boundary of the grid areas based on a cell shape of the grid cells.

* * * * *